US011625573B2

(12) United States Patent
Gliozzo et al.

(10) Patent No.: US 11,625,573 B2
(45) Date of Patent: Apr. 11, 2023

(54) RELATION EXTRACTION FROM TEXT USING MACHINE LEARNING

(71) Applicant: International Business Machines Corporation, Armonk, NY (US)

(72) Inventors: Alfio Massimiliano Gliozzo, Brooklyn, NY (US); Gaetano Rossiello, Brooklyn, NY (US); Robert G. Farrell, Cornwall, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1200 days.

(21) Appl. No.: 16/173,534

(22) Filed: Oct. 29, 2018

(65) Prior Publication Data

US 2020/0134422 A1 Apr. 30, 2020

(51) Int. Cl.
| | |
|---|---|
| *G06N 3/04* | (2023.01) |
| *G06N 3/08* | (2023.01) |
| *G06N 3/045* | (2023.01) |
| *G06F 40/20* | (2020.01) |
| *G06N 3/048* | (2023.01) |

(52) U.S. Cl.
CPC ............ *G06N 3/045* (2023.01); *G06F 40/20* (2020.01); *G06N 3/048* (2023.01); *G06N 3/08* (2013.01)

(58) Field of Classification Search
CPC ....... G06N 3/0454; G06N 3/0481; G06N 3/08
See application file for complete search history.

(56) References Cited

U.S. PATENT DOCUMENTS

| | | | |
|---|---|---|---|
| 9,082,078 B2 | 7/2015 | Palmer et al. | |
| 9,190,026 B2 | 11/2015 | Yang et al. | |
| 11,055,355 B1* | 7/2021 | Monti | G06F 16/90332 |
| 2010/0324883 A1* | 12/2010 | Platt | G06F 40/40 |
| | | | 706/12 |
| 2014/0249799 A1 | 9/2014 | Yih et al. | |
| 2014/0359691 A1* | 12/2014 | Woods | H04L 63/14 |
| | | | 726/1 |
| 2018/0121785 A1* | 5/2018 | Min | G06N 5/04 |
| 2018/0121788 A1* | 5/2018 | Hashimoto | G06N 3/084 |

(Continued)

OTHER PUBLICATIONS

Chi et. al., "A Sentence Similarity Estimation Method Based on Improved Siamese Network", Oct. 24, 2018 (Year: 2018).*

(Continued)

*Primary Examiner* — Omar F Fernandez Rivas
*Assistant Examiner* — Selene A. Haedi
(74) *Attorney, Agent, or Firm* — Garg Law Firm, PLLC; Rakesh Garg; Peter Edwards

(57) ABSTRACT

A first neural network is operated on a processor and a memory to encode a first natural language string into a first sentence encoding including a set of word encodings. Using a word-based attention mechanism with a context vector, a weight value for a word encoding within the first sentence encoding is adjusted to form an adjusted first sentence encoding. Using a sentence-based attention mechanism, a first relationship encoding corresponding to the adjusted first sentence encoding is determined. An absolute difference between the first relationship encoding and a second relationship encoding is computed. Using a multi-layer perceptron, a degree of analogical similarity between the first relationship encoding and a second relationship encoding is determined.

20 Claims, 7 Drawing Sheets

(56) References Cited

U.S. PATENT DOCUMENTS

| | | | |
|---|---|---|---|
| 2019/0080225 A1* | 3/2019 | Agarwal | G06N 5/04 |
| 2019/0122145 A1* | 4/2019 | Sun | G06F 40/30 |
| 2019/0197121 A1* | 6/2019 | Jeon | G10L 25/51 |
| 2019/0205733 A1* | 7/2019 | Ghaeini | G06K 9/6267 |
| 2020/0065873 A1* | 2/2020 | Ruvini | G06F 16/338 |

OTHER PUBLICATIONS

Zhu et. al. "A Semantic Similarity Computing Model based on Siamese Network for Duplicate Questions Identification", Aug. 2018 (Year: 2018).*

Liu et. al., "Matching Natural Language Sentences with Hierarchical Sentence Factorization", Apr. 2018 (Year: 2018).*

Ma et. al., "Matching Descriptions to Spatial Entities using a Siamese Hierarchical Attention Network", Jun. 2018 (Year: 2018).*

Mueller et. al., "Siamese Recurrent Architectures for Learning Sentence Similarity", 2016 (Year: 2016).*

Guo et al., "CRAN: A Hybrid CNN-RNN Attention-Based Model for Text Classification", Sep. 2018 (Year: 2018).*

Yang et al., "Hierarchical Attention Networks for Document Classification", 2016 (Year: 2016).*

Shen et al., "DiSAN: Directional Self-Attention Network for RNN/CNN-Free Language Understanding", Apr. 2018 (Year: 2018).*

Alishahi et al., "Sentence-based attentional mechanisms in word learning: evidence from a computational model", 2012 (Year: 2012).*

Thomas Pevny et al., Converting String Data to Fixed Length Numerical Vectors, Mar. 16, 2016.

Pranjal Daga et al., Domain-Specific Language Model Using Domain Literature and Experts' Spoken Language, Oct. 20, 2017.

Ketih J. Holyoak, Analogy and Relational Reasoning, 2012.

Andrew Lampinen et al., Analogies Emerge from Learning Dyamics in Neural Networks, 2017.

Anonymous, System and Method for Comprehension and Inference of DL Model from Image Sources, Jul. 26, 2018.

Peter D. Turney, Measuring Semantic Similarity by Latent Relational Analysis, Aug. 10, 2005.

Thomas Mikolov et al., Efficient Estimation of Word Representations in Vector Space, Sep. 7, 2013.

Jeffrey Pennington et al., GloVe: Global Vectors for Word Representation, Aug. 2014.

* cited by examiner

RELATION EXTRACTION FROM TEXT USING MACHINE LEARNING

TECHNICAL FIELD

The present invention relates generally to a method, system, and computer program product for text analysis in machine learning. More particularly, the present invention relates to a method, system, and computer program product for relation extraction from text using machine learning.

BACKGROUND

Every day, users generate and store unstructured text, written in natural language—documents, messages, social media postings, and the like. Further, audio in natural language is often converted to natural language text. Here, natural language refers to a language used by humans to communicate, as distinct from a language used by humans to communicate with machines, or a language used by machines to communicate with each other. Natural language uses unstructured text—text that either does not have a pre-defined data model or is not organized in a pre-defined manner, such as stored in fielded form in a database or semantically tagged in a documents. In contrast, structured text does have a pre-defined data model or is stored in a pre-defined manner.

Such unstructured text is an important source of knowledge. However, such knowledge is much more easily found, used, and added to when converted to a structured format for storage and use—for example in systems for automatic population of a knowledge base, knowledge management, information retrieval, machine translation, and question-answering.

Information extraction is a key step in analyzing unstructured text. Information extraction extracts a specific kind of information—for example, a subject, sentiment value, or similar characteristic—from a repository of unstructured text and outputs the information in a structured form, such as a relational table or an XML file.

Relation extraction is an important component of information extraction. Relation extraction, in machine learning, is the task of identifying semantic relationships between entities in unstructured text. For example, given the sample, "Paul McCartney sang in THE BEATLES," relation extraction determines that there is a relationship, expressed by "sang in", between the person Paul McCartney and the musical group called THE BEATLES. (THE BEATLES is a registered trademark of Apple Corps Limited in the United States and other countries.)

SUMMARY

The illustrative embodiments provide a method, system, and computer program product. An embodiment includes a method that operates a first neural network on a processor and a memory to encode a first natural language string into a first sentence encoding comprising a set of word encodings. An embodiment adjusts, using a word-based attention mechanism with a context vector, a weight value for a word encoding within the first sentence encoding to form an adjusted first sentence encoding. An embodiment determines, using a sentence-based attention mechanism, a first relationship encoding corresponding to the adjusted first sentence encoding. An embodiment computes an absolute difference between the first relationship encoding and a second relationship encoding. An embodiment determines, using a multi-layer perceptron, a degree of analogical similarity between the first relationship encoding and a second relationship encoding.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
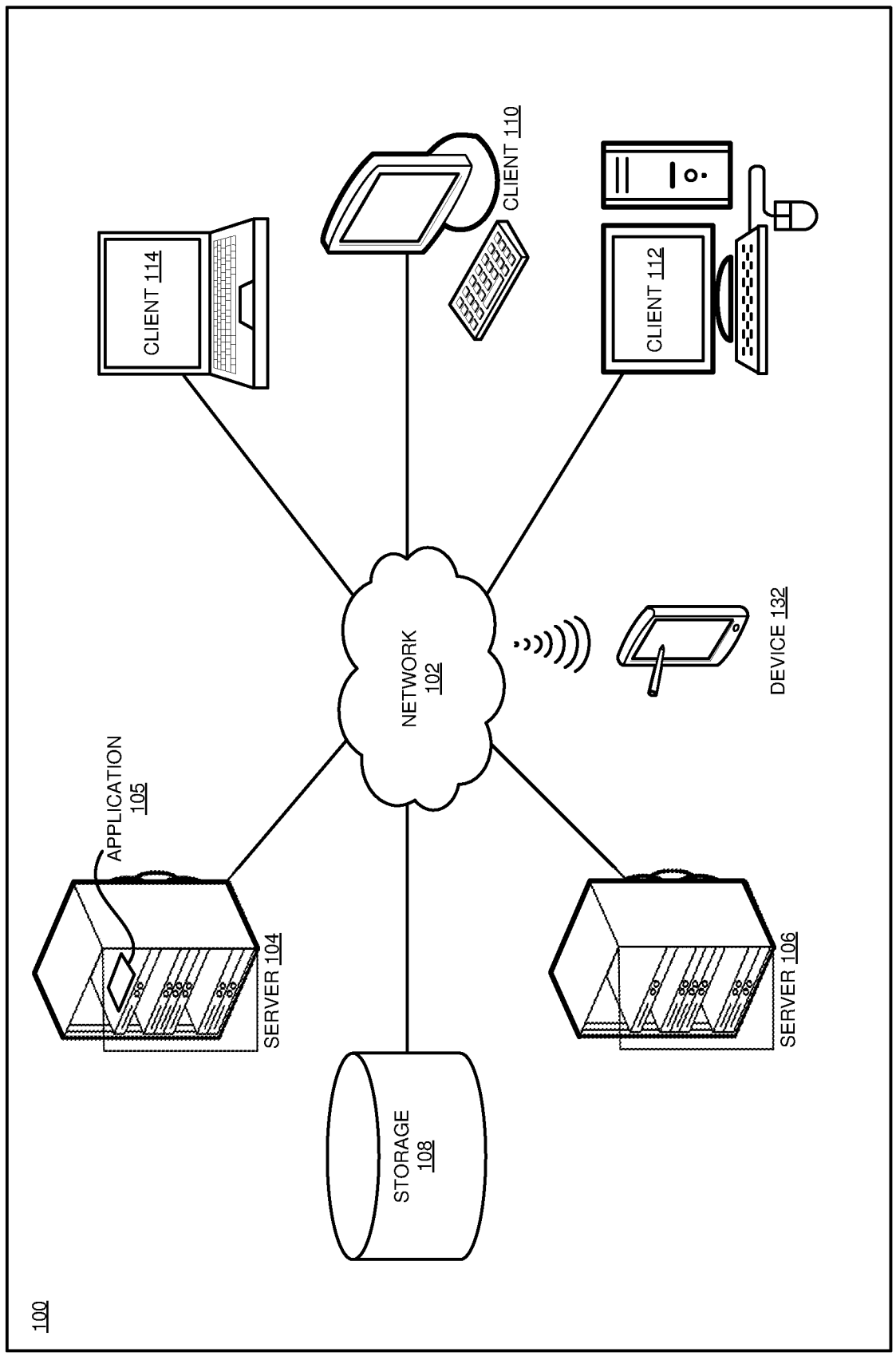
FIG. 1 depicts a block diagram of a network of data processing systems in which illustrative embodiments may be implemented.

The illustrative embodiments recognize that because relation extraction systems are important building blocks in systems that process natural language, adapting an existing relation extraction system to a new knowledge domain is an important task. For efficiency, such adapting should be done with minimal human effort and fluent user interaction, while reusing pre-existing knowledge assets. One technique in adapting existing relation extraction system to a new knowledge domain makes use of analogies.

An analogy represents a common relationship between pairs of entities. In other words, if two pairs of entities have at least one relationship in common, the pairs of entities are considered analogous. For example, the samples "Paul McCartney sang in THE BEATLES," and "Mick Jagger sang in the ROLLING STONES," are analogous because the relationship between Paul McCartney and THE BEATLES ("sang in") is the same as the relationship between the person Mick Jagger and the musical group called the ROLL- ING STONES. (ROLLING STONES is a registered trademark of Musidor B.V. Limited Liability Company in the United States and other countries.)

Most machine learning techniques require a set of training data. A traditional approach for collecting training data is to have humans label a set of documents. This approach is expensive in terms of both time and money, and often does not yield enough data for machine learning algorithms to work effectively. And because humans make errors, the resulting training data will most likely be noisy.

An alternative approach to generating training data is distant supervision. Distant supervision makes use of an already existing database to collect examples of appropriate training data, then use these examples to automatically generate a full set of training data.

One known technique, Latent Relational Analysis (LRA), measures similarity in semantic relations between two pairs of words. Two pairs of words with a high degree of relational similarity are considered analogous. For example, the pair cat:meow is analogous to the pair dog:bark. LRA takes as input a set of word pairs and produces as output a measure of the relational similarity between any two of the input pairs, using a search engine with a very large corpus of text and a broad-coverage thesaurus of synonyms. The thesaurus of synonyms is used to extend the set of input word pairs to synonyms of each word. The text corpus is used to find text phrases containing the word pairs (and synonyms)—these text phrases reflect relationships between the word pairs. Then the text phrases are analyzed to determine similarities. However, LRA is limited by the need for a suitable text corpus and a suitable thesaurus of synonyms. When adapting a relation extraction system to a new knowledge domain, such data will likely have to be assembled by human workers, taking time and risking coverage gaps.

Another known technique, Word2Vec, uses a shallow, two-layer neural network to learn vectors representing words in a text corpus. Then the technique answers analogy questions by performing simple algebraic operations with the vector representations. For example, to find a word that is similar to small in the same sense as biggest is similar to big, this technique computes vector X=vector("biggest")–vector("big")+vector("small"), then searches the vector representations of all the known words for the word closest to X measured by cosine distance.

Another known technique, GloVe, uses an unsupervised learning algorithm, trained using statistics tabulating how frequently words co-occur with one another in a given corpus, to generate vector representations for words. The vector representations are computed such that the dot product of two vectors equals the logarithm of the words' probability of co-occurrence. As a result, vector differences between analogous word pairs, for example man-woman, king-queen, and brother-sister are all be roughly equal. However, training requires the collection of statistics from an entire text corpus, which can be computationally expensive for a large corpus.

The illustrative embodiments recognize that LRA, which is designed to analyze word pairs for similarity, requires additional preprocessing to generate word pairs for analysis. As well, the Word2Vec and GloVe techniques are limited to words that have already been analyzed during training, and thus are unsuitable for computing analogies between out-of-vocabulary words.

The illustrative embodiments recognize that the presently available tools or solutions do not address these needs or provide adequate solutions for these needs. The illustrative embodiments used to describe the invention generally address and solve the above-described problems and other problems related to relation extraction from text using machine learning.

An embodiment can be implemented as a software application. The application implementing an embodiment can be configured as a modification of an existing text relation extraction system, as a separate application that operates in conjunction with an existing text relation extraction system, a standalone application, or some combination thereof.

Particularly, some illustrative embodiments provide a method by which a neural network is configured, trained, and used to extract relationships between entities in strings of natural language text.

An embodiment receives as input a pair of strings of natural language text. Typically, such strings range in size from a few words to several sentences, but as a non-limiting example are described herein as one sentence long. An embodiment is configurable to process longer strings, simply by scaling up in size and corresponding computational resources. An embodiment analyzes the pair of strings and produces an output indicating a degree of analogical similarity between the two strings. For example, the degree of analogical similarity can be a real number between 0 and 1. An embodiment further converts the degree of analogical similarity into a binary output. For example, if the degree of analogical similarity is a real number between 0 and 1, any degree of analogical similarity below 0.5 is converted to 0, meaning the two strings are not analogous, and any other result is converted to 1, meaning the two strings are analogous.

Thus, after conversion to a binary output, an embodiment has determined that two pairs of entities within each string are analogous—sharing at least one relation—or not analogous. For example, given the strings "Paul McCartney sang in THE BEATLES," and "Mick Jagger sang in the Rolling Stones ROLLING STONES," an embodiment would conclude that the two strings are analogous because the relationship between Paul McCartney and THE BEATLES ("sang in") is the same as the relationship between Mick Jagger and the musical group called the ROLLING STONES. Similarly, given the strings "Paul McCartney sang in THE BEATLES," and "David Gilmour was a member of the rock band Pink Floyd PINK FLOYD," an embodiment would conclude that the two strings are analogous because the relationship between Paul McCartney and THE BEATLES ("sang in") is sufficiently similar to the relationship between David Gilmour and PINK FLOYD ("member of"). (PINK FLOYD is a registered trademark of Pink Floyd (1987) Limited Company in the United States and other countries.) On the other hand, given the strings "Paul McCartney sang in THE BEATLES," and "Rome is the capital of Italy," an embodiment would conclude that the two strings are not analogous because the relationship between Paul McCartney and THE BEATLES ("sang in") is not sufficiently similar to the relationship between Rome and Italy ("capital of").

An embodiment includes a hierarchical, multi-layer Siamese neural network configured to receive a pair of strings of natural language text as input and score the pair of strings as analogous or not analogous. Siamese neural networks have symmetric twin sub-networks, each having the same parameters. Each sub-network learns a vector representation of a relationship between two entities in an input string, then a merging layer compares the two vector representations.

Each sub-network of an embodiment includes a layer for word representations holding a latent semantic representation of words in an input string. The word layer receives as input a string of natural language, such as a sentence, and maps each word in the input string into a corresponding word embedding—a real-valued vector. An embodiment can be configured to use a set of existing, standard mappings from words to corresponding word embeddings. Alternatively, an embodiment can be configured to use a random word embedding corresponding to each word. In either case, an embodiment need only determine such mappings once, and does not need to update such mappings during training or use. The actual value of a word embedding is unimportant, as long as a particular word is always mapped to the same word embedding.

The word layer further encodes the sequence of word embeddings of a sentence into a sentence encoding, using a bidirectional Gated Recurrent Unit (GRU). A GRU is a kind of recurrent neural network. One embodiment uses dimension of the output of the GRU of 64, providing an overall encoder dimension of 128, although other dimensions are possible and contemplated within the scope of the illustrative embodiments. Such units compose word embeddings, taking into account the positions of words within a sentence. Taking word positions into account is critical to interpreting phrases such as "is the capital of". For example, the sentence "Rome is the capital of Italy" implies that Rome is a capital city and Italy is a country, while "Italy is the capital of Rome" implies that Italy is a capital city and Rome is a country. As a result, the word layer holds a dense representation of the sequence of words in the input sentence.

Each sub-network of an embodiment includes a sentence layer holding a latent semantic representation of the whole sequence of input words. The sentence layer uses an attention mechanism with a context vector to combine the output of each word layer into a single vector representing the entire sentence. The attention mechanism consists of weights associated to each output of the GRU of the word layer. The attention weights are real numbers automatically learned during the training of the siamese network. Thus, the attention mechanism with context vector rewards, or provides higher weights to, the words that are important in expressing a relation in the input string, then aggregates the weights of the important words in the sentence representation. For example, given the string "Paul McCartney sang in THE BEATLES," "sang" is an important word that expresses the relation "is a member of". Similarly, in the string "Ringo Starr was the drummer in THE BEATLES," "drummer" is also an important word that expresses the relation "is a member of".

Each sub-network of an embodiment includes a relation layer holding a latent semantic representation of a relationship. The relation layer implements an attention mechanism at the sentence level to weight the input sentences differently so as to give higher weight to input strings that are used in expressing a relationship between entities in the strings. Thus, the relation layer takes as an input the adjusted encoded sentence from the sentence layer and encodes a relationship between entities into a vector. Weights, in the relation layer, apply to sentences rather than words.

Thus, the word layer, context layer, and relation layer of each twin sub-network of an embodiment convert an input string, such as a sentence, into an encoded representation, such as an embedding, of a relationship between entities in the input string. Because each sub-network outputs an embedding representing a relationship, the outputs of each sub-network can be compared to determine a similarity level of the relationships two input strings express. If two input strings express similar enough relationships—above a similarity threshold—the two input strings are analogous.

A merging layer of an embodiment receives as input the relationship embeddings output by each of the two sub-networks and computes a degree of analogical similarity between the relationship embeddings. To compute the degree of analogical similarity, the merging layer computes an absolute distance, in vector form, between the two relationship embeddings, then routes the absolute distance through a multi-layer perceptron with a sigmoid activation function as output unit. Thus, the merging layer computes a degree of analogical similarity between encoded relationships, where weights measure the importance of each element of the difference vector between the encoded relationships. The output unit converts the degree of analogical similarity into a binary classification—the two encoded relationships are either analogous or they are not. Thus, the hierarchical siamese neural network of an embodiment, composed of word, sentence and relation layers, receives a pair of strings of natural language text as input and provides a score, reflecting an degree of analogical similarity between a pair of strings. Alternatively, an embodiment is configurable by setting a threshold to output a binary value which determines if the pair of strings as analogous or not analogous.

The neural network components of an embodiment must be trained before use. To begin training, an embodiment uses data indicating that there is a relationship between two entities, although there is no need to know the type of relationship. Such data can be as simple as a collection of word pairs, each with a known relationship between each word in the pair. For example, one such word pair might be capital (Rome, Italy), indicating that Rome (the city) has a capital relationship to Italy (the country). Another such word pair might be member (Paul McCartney, THE BEATLES), indicating that Paul McCartney was a member of the musical group THE BEATLES.

General-purpose collections of such data are available for use. For example, DBpedia is a collection of structured data, including entity relationship data, for entities such as persons, places, organizations, music albums, species, and diseases. Much of the data was originally extracted from the WIKIPEDIA online encyclopedia. (WIKIPEDIA is a registered trademark of Wikimedia Foundation, Inc. in the United States and other countries.)

Special-purpose collections of such data may also be available, for use in converting an existing relation extraction system from one knowledge domain to another. If such a special-purpose collection is not available, human workers can quickly create one.

An embodiment generates positive examples for each relationship by extracting a set of entity pairs having the same relationship, then generating pairs of entity pairs. Each pair of entity pairs has the same relationship, so each is analogous to the others. For each positive example in the training dataset, an embodiment generates a negative example for the training dataset by randomly choosing two entity pairs with different relationships.

An embodiment obtains a corresponding text string, typically a sentence, corresponding to each word pair in the entity relationship data. To obtain the corresponding text, an embodiment searches a text corpus for one or more unstructured text sentences incorporating the related entities. For example, given the word pair capital (Rome, Italy), one corresponding text string could be, "Rome is the capital of Italy," and another could be "Italy's capital is Rome." Any suitably-large text corpus incorporating a sufficient variety of sentences, covering a sufficient variety of text expressing similar relationships in different ways, may be used for this purpose. For example, a text corpus suitable for general-purpose training may be an online encyclopedia such as WIKIPEDIA. When implementing relation extraction in a new specialized knowledge domain, a text corpus incorporating an unstructured collection of text incorporating entities in the specialized knowledge domain is a better source of suitable training sentences than a general-purpose text corpus.

An embodiment uses the text strings corresponding to each word pair as training data. Two word pairs expressing the same relationship are analogous, and two word pairs expressing different relationships are not analogous. For example, capital (Rome, Italy) is analogous to capital (Paris, France). Thus the strings "Rome is the capital of Italy" and "France's capital is Paris" are also analogous. However, capital (Rome, Italy) is not analogous to member (Paul McCartney, THE BEATLES) because capital( ) is not the same relationship as member( ). Thus, the strings "Rome is the capital of Italy" and "Paul McCartney sang in THE BEATLES" are also not analogous.

To train the neural network, an embodiment feeds one text string, incorporating a related word pair, into one of the twin sub-networks and feeds a second text string, also incorporating a related word pair, into the other of the twin sub-networks. The embodiment optimizes the neural network to return a positive label if the two text strings are analogous, and a negative label if the two text strings are not analogous. Thus, continuing the example, if the string "Rome is the capital of Italy" is fed into one of the twin sub-networks and the string "France's capital is Paris" is fed into the other of the twin sub-networks, an embodiment trains the neural network is trained to output a positive label for these two strings. Similarly, if the string "Rome is the capital of Italy" is fed into one of the twin sub-networks and the string "Paul McCartney sang in THE BEATLES" is fed into the other of the twin sub-networks, an embodiment trains the neural network to output a negative label for these two strings.

Once trained, an embodiment is used to determine if text strings are analogous to each other. Just as in training, pairs of text strings are input into the neural network of the embodiment, with one text string input into each of the twin sub-networks. The neural network determines whether or not the pairs of text strings are analogous. Alternatively, an embodiment is configurable to output a degree of analogical similarity between the two text strings.

An embodiment, once trained, is also used to classify the relationship of a pair of entities, as expressed in a text string, as one of a set of known relationships. To do this, a text string including an unknown relationship is fed into one input of a trained network, and a text string including an known relationship is fed into other input of a trained network. If the embodiment determines that the two strings are analogous, the string with the unknown relationship has now been classified—to the same relationship as the other input string.

The manner of text relation extraction described herein is unavailable in the presently available methods. A method of an embodiment described herein, when implemented to execute on a device or data processing system, comprises substantial advancement of the functionality of that device or data processing system in using twin sub-networks to encode natural language strings expressing relationships between entities and comparing respective relationship encodings to determine a degree of analogical similarity between the input strings.

The illustrative embodiments are described with respect to certain types of GRU, neural networks, attention mechanisms, output units, weightings, relationships, degrees of similarity, natural language strings, natural language word pairs, trainings, training sets, thresholds, validations, responses, adjustments, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
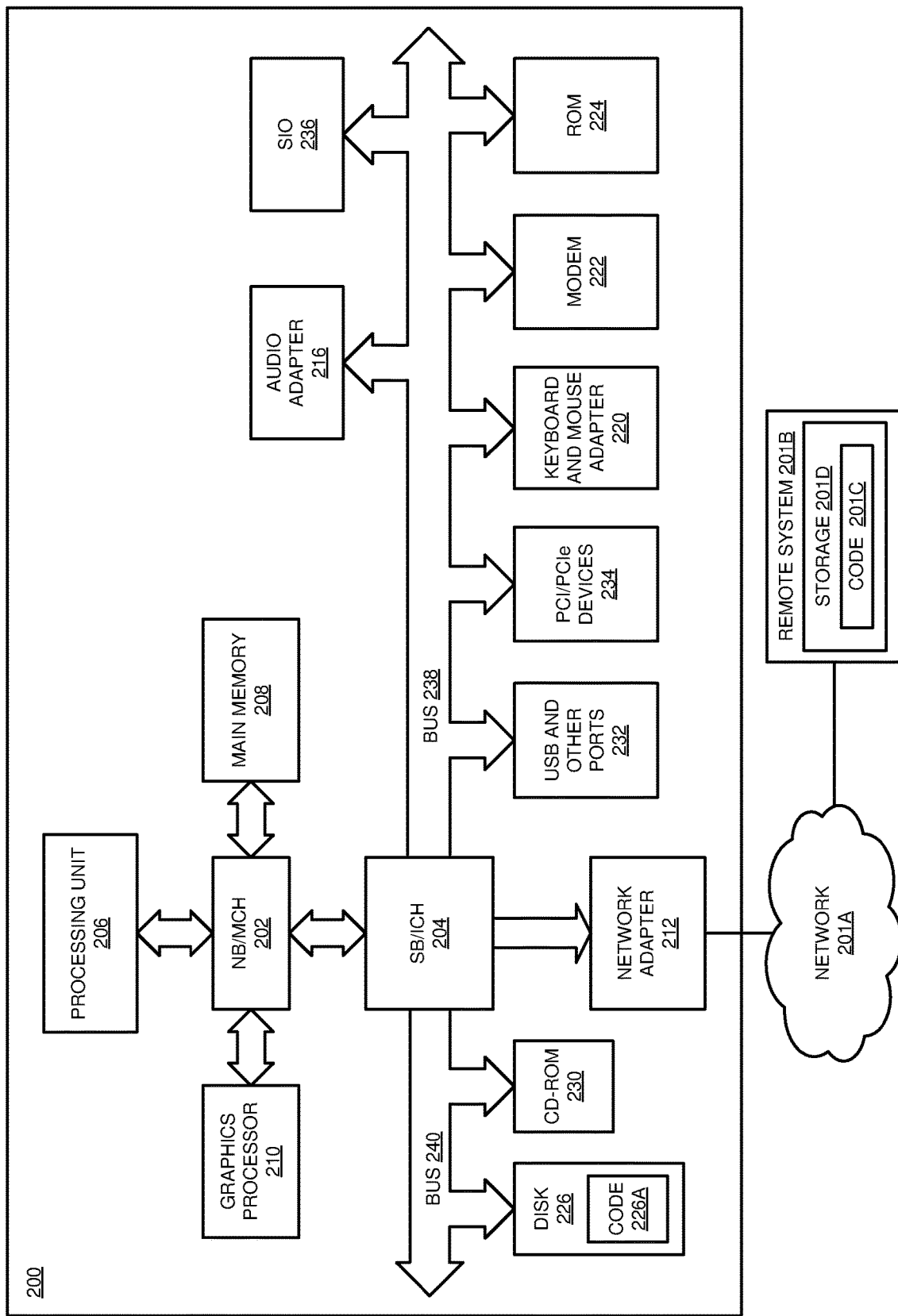
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 can be implemented in any of data processing systems 104, 106, 110, 112, and 114 and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/ output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
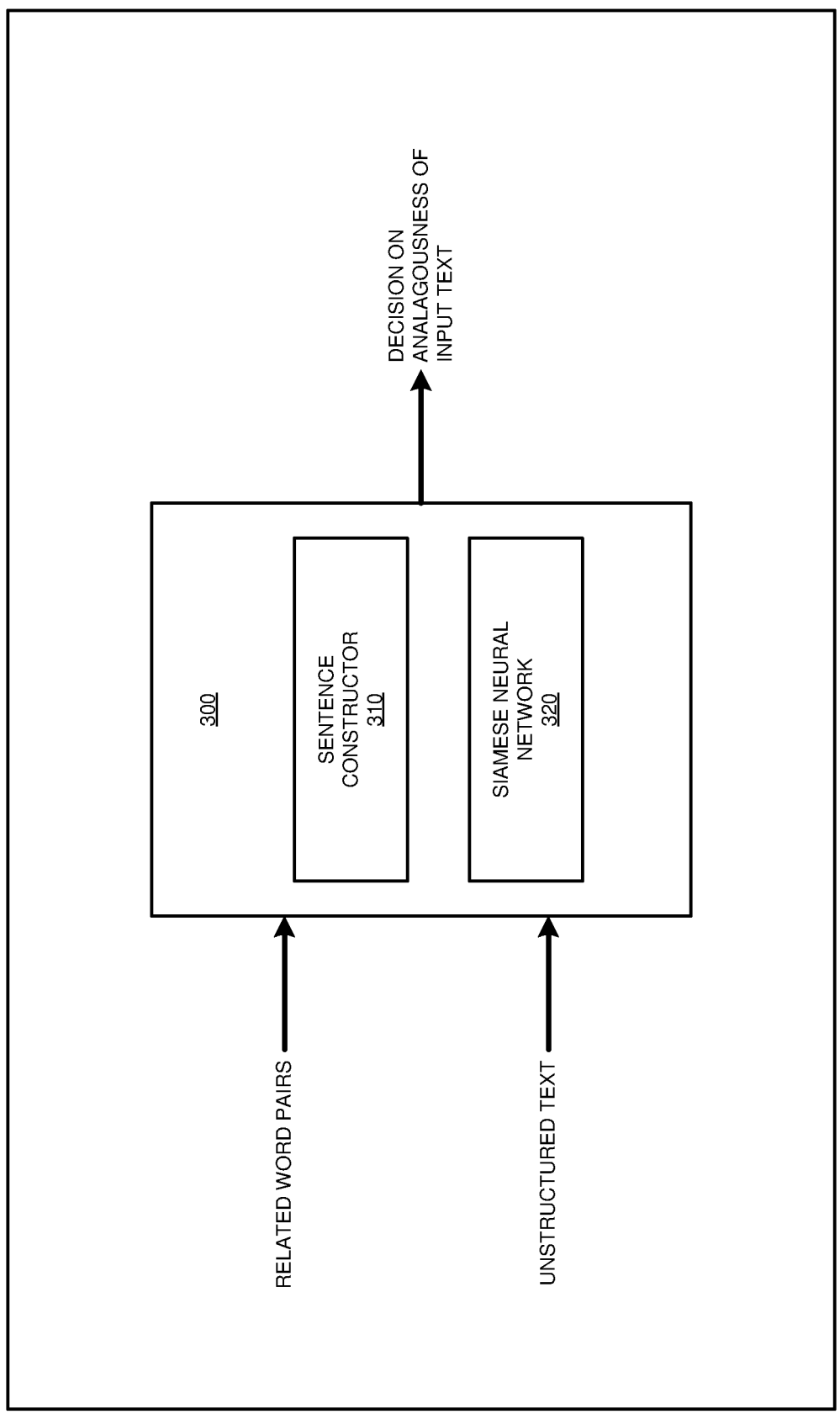
FIG. 3 depicts a block diagram of an example configuration for relation extraction from text using machine learning in accordance with an illustrative embodiment.

With reference to FIG. 3, this figure depicts a block diagram of an example configuration for relation extraction from text using machine learning in accordance with an illustrative embodiment. Application 300 is an example of application 105 in FIG. 1 and executes in any of servers 104 and 106, clients 110, 112, and 114, and device 132 in FIG. 1.

Sentence constructor module 310 takes as input word pairs, each with a known relationship between each word in the pair. For example, one such word pair might be capital (Rome, Italy), indicating that Rome (the city) has a capital relationship to Italy (the country). For each word pair, sentence constructor module 310 obtains a corresponding sentence from any suitable source. One suitable source is a text corpus containing one or more unstructured text sentences incorporating the related entities. For example, given the word pair capital (Rome, Italy), one corresponding text string could be, "Rome is the capital of Italy," and another could be "Italy's capital is Rome." Any suitably-large text corpus incorporating a sufficient variety of sentences, covering a sufficient variety of text expressing similar relationships in different ways, may be used for this purpose. For example, when implementing relation extraction in a new specialized knowledge domain, a text corpus incorporating an unstructured collection of text incorporating entities in the specialized knowledge domain can be used instead of a general-purpose text corpus.

Siamese neural network module 320 is a hierarchical, multi-layer siamese neural network configured to receive a pair of strings of natural language text as input. Module 320 computes a degree of analogical similarity between the two strings, and uses the degree of analogical similarity to score the pair of strings as analogous or not analogous. Module 320 includes symmetric twin sub-networks, each having the same parameters, with outputs joined by an merging layer to produce one output incorporating a difference between outputs of the two sub-networks. Each sub-network learns a vector representation of a relationship between two entities in an input string, and the merging layer compares the two vector representations. Module 320 must be trained before use.

Figure 4:
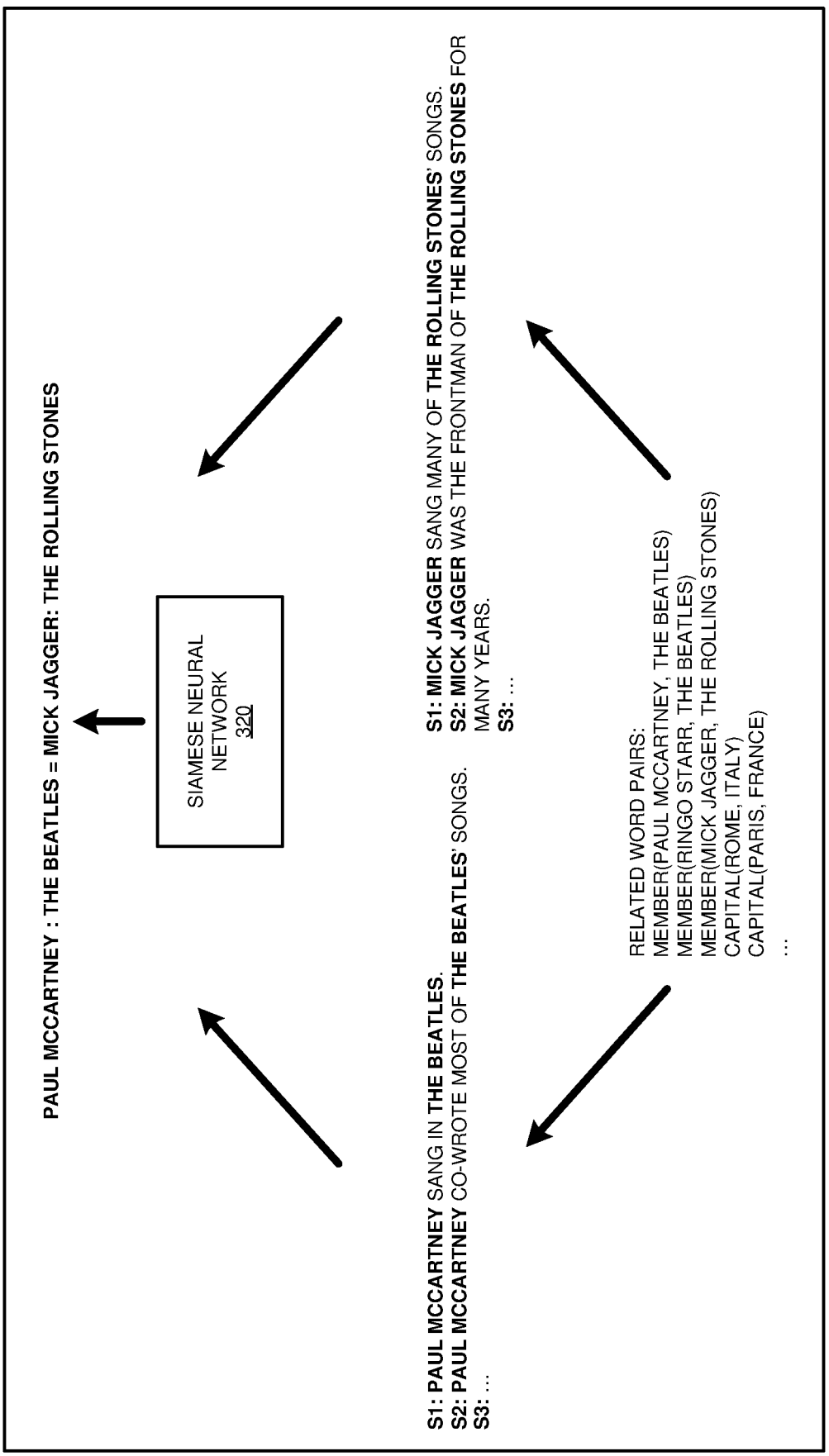
FIG. 4 depicts an example of a word pair to sentence conversion process, in accordance with an illustrative embodiment.

With reference to FIG. 4, this figure depicts an example of the word pair to sentence conversion process performed by sentence constructor module 310 in FIG. 3, in accordance with an illustrative embodiment. Siamese neural network module 320 is the same as siamese neural network module 320 in FIG. 3.

In particular, FIG. 4 depicts a collection of related word pairs and example sentences corresponding to two of the word pairs. On the left side, FIG. 4 depicts a collection of sample sentences, S1, S2, and S3, corresponding to the related word pair member (Paul McCartney, THE BEATLES). On the right side, FIG. 4 shows a collection of sample sentences, S1, S2, and S3, corresponding to the related word pair member (Mick Jagger, the ROLLING STONES). One of each collection of sample sentences is input to module 320 for analysis.

Figure 5:
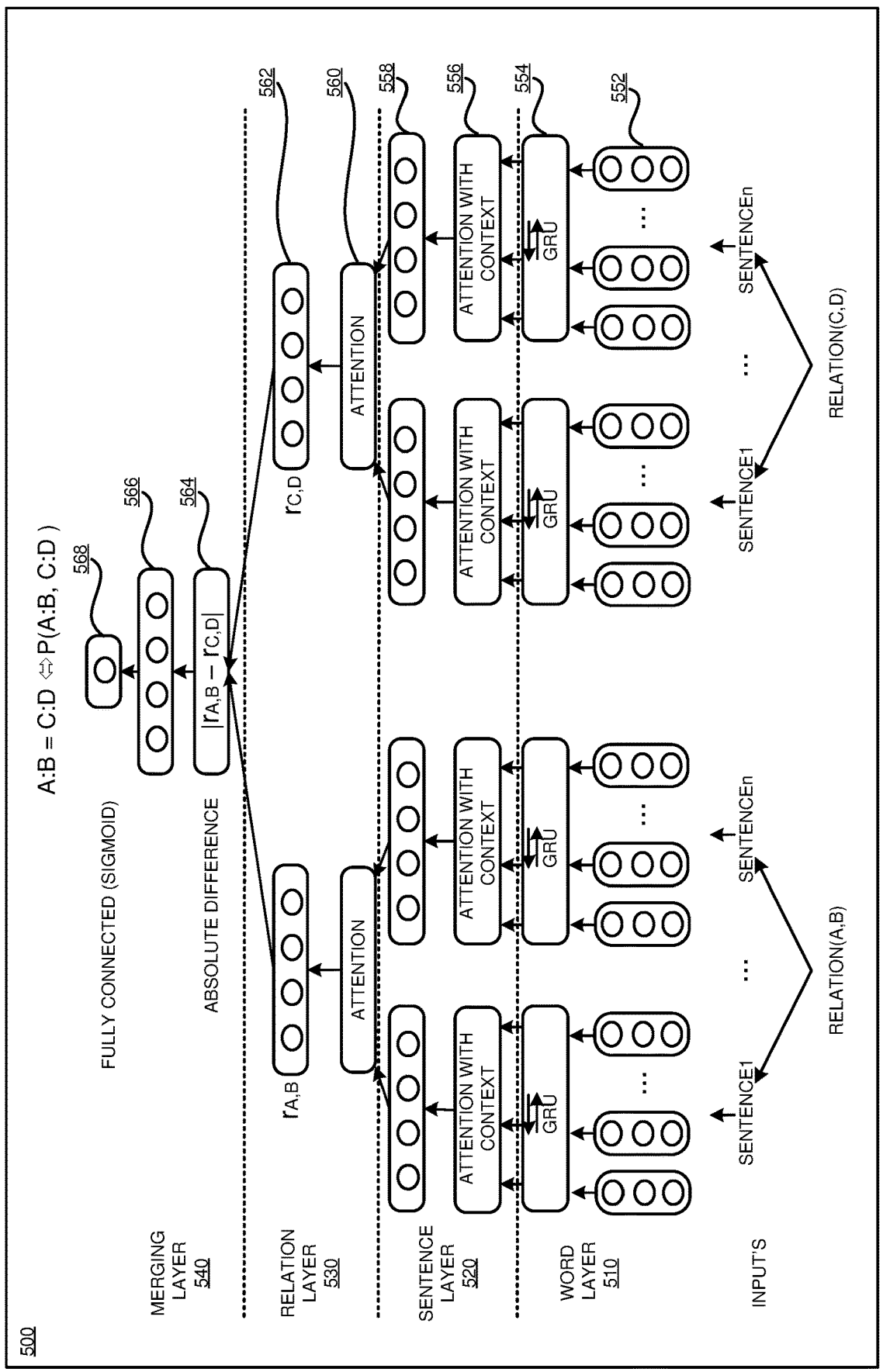
FIG. 5 depicts a neural network module, in accordance with an illustrative embodiment.

With reference to FIG. 5, this figure depicts more detail of siamese neural network module 320 in FIG. 3, in accordance with an illustrative embodiment. In particular, neural network 500 is part of application 103 in FIG. 3 and executes in any of servers 104 and 106, clients 110, 112, and 114, and device 132 in FIG. 1.

Neural network 500 is a hierarchical, multi-layer siamese neural network configured to receive a pair of strings of natural language text as input and score the pair of strings as analogous or not analogous. Neural network 500 has symmetric twin sub-networks, each having the same parameters, with outputs joined by an merging layer to produce one output incorporating a difference between outputs of the two sub-networks.

Each sub-network of network 500 includes a word layer 510, holding a latent semantic representation of words in an input string. The word layer receives as input a string of natural language, such as a sentence, and maps each word in the input string into a corresponding word embedding 552—a real-valued vector.

Word layer 510 further encodes the sequence of word embeddings of a sentence into a sentence encoding, using a bidirectional GRU 554. Each GRU 554 composes word embeddings, taking into account the positions of words within a sentence. As a result, word layer 510 holds a dense representation of the sequence of words in the input sentence.

Each sub-network of network 500 includes a sentence layer 520, holding a latent semantic representation of the whole sequence of input words. Sentence layer 520 uses attention mechanism 556, with a context vector, to combine the output of each word layer 510 into a single vector 558 representing the entire sentence. Attention mechanism 556 includes weights associated to each output of each GRU 554 of word layer 510. The attention weights are real numbers automatically learned during the training of the siamese network. Thus, sentence layer 520 rewards, by providing higher weights, to the words that are important in expressing a relation in the input string, then aggregates the weights of the important words in the sentence representation.

Each sub-network of network 500 includes a relation layer 530 holding a latent semantic representation of a relationship. Relation layer 530 implements an attention mechanism 560 at the sentence level to weight the input sentences differently so as to give higher weight to input strings that are used in expressing a relationship between entities in the strings. Thus, relation layer 530 takes as an input the adjusted encoded sentence from sentence layer 520 and encodes a relationship between entities into a vector 562. Weights, in relation layer 530, apply to sentences rather than words.

Network 500 includes merging layer 540, that receives as input the relationship embeddings output by each of the two sub-networks and computes a degree of analogical similarity between the relationship embeddings. To compute the degree of analogical similarity, merging layer 540 uses module 564 to compute an absolute distance, in vector form, between the two relationship embeddings, then routes the absolute distance through multi-layer perceptron 566 with a sigmoid activation function as output unit 568. Thus, merging layer 540 computes a degree of analogical similarity between encoded relationships, where weights measure the importance of each element of the difference vector between the encoded relationships. Output unit 568 converts the degree of analogical similarity into a binary classification—the two encoded relationships are either analogous or they are not.

Thus, network 500 receives a pair of strings of natural language text as input and scores the pair of strings as analogous or not analogous. Alternatively, network 500 bypasses sigmoidal output unit 568 to output a similarity score, reflecting degree of analogical similarity between a pair of strings, instead of the binary classification.

Figure 6:
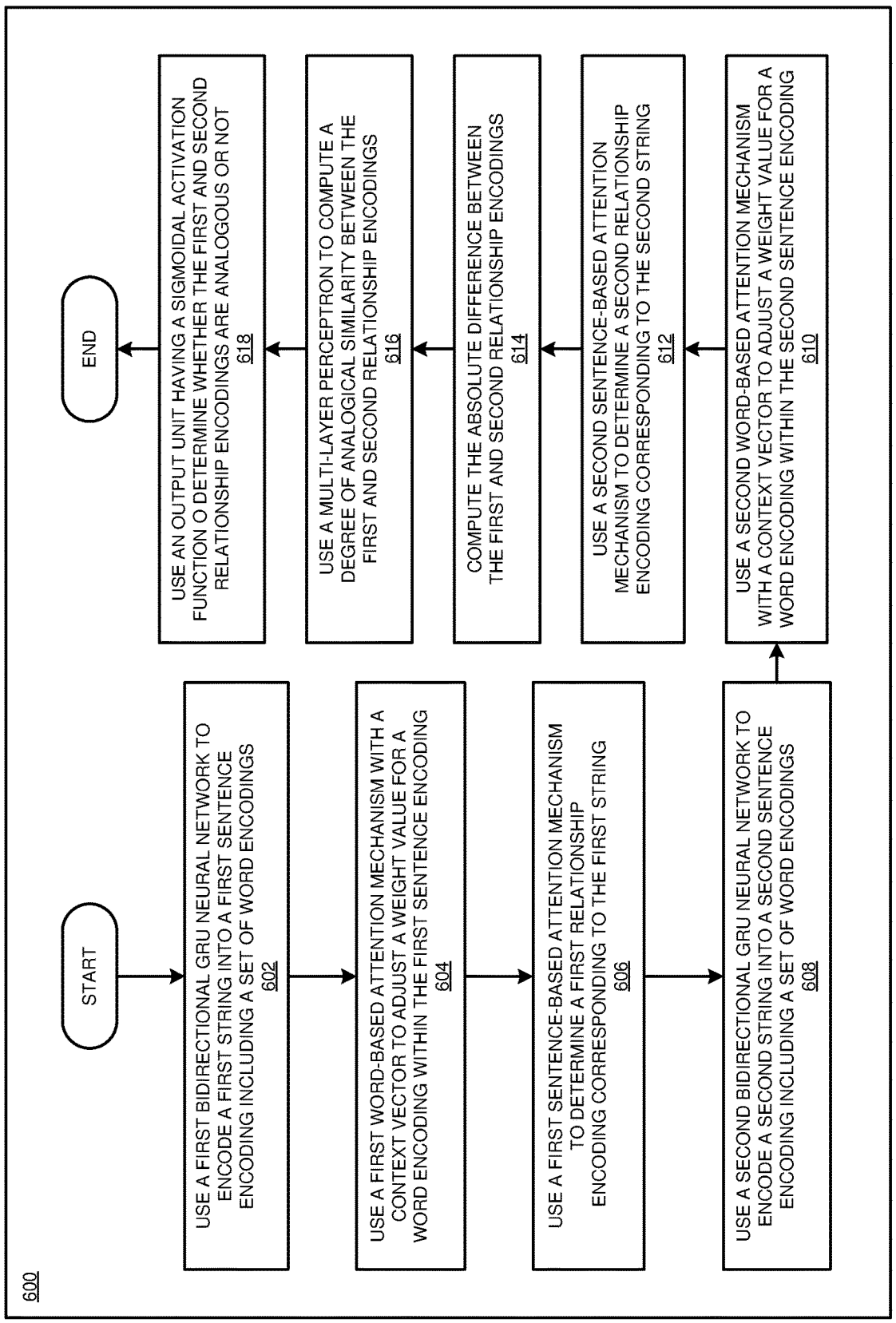
FIG. 6 depicts a flowchart of an example process for relation extraction from text using machine learning in accordance with an illustrative embodiment.

With reference to FIG. 6, this figure depicts a flowchart of an example process for relation extraction from text using machine learning in accordance with an illustrative embodiment. Process 600 can be implemented in application 300 in FIG. 3.

In block 602, the application uses a first bidirectional GRU neural network to encode a first string into a first sentence encoding including a set of word encodings. In block 604, the application uses a first word-based attention mechanism with a context vector to adjust a word encoding within the first sentence encoding. In block 606, the application uses a first sentence-based attention mechanism to determine a first relationship encoding corresponding to the first string. In block 608, the application uses a second bidirectional GRU neural network to encode a second string into a second sentence encoding including a set of word encodings. In block 610, the application uses a second word-based attention mechanism with a context vector to adjust a word encoding within the second sentence encoding. In block 612, the application uses a second sentence-based attention mechanism to determine a second relationship encoding corresponding to the second string. In block 614, the application computes the absolute difference between the first and second relationship encodings. In block 616, the application uses a multi-layer perceptron to compute a degree of analogical similarity between the first and second relationship encodings. In block 618, the application uses an output unit having a sigmoidal activation function to determine whether the first and second relationship encodings are analogous or not.

Figure 7:
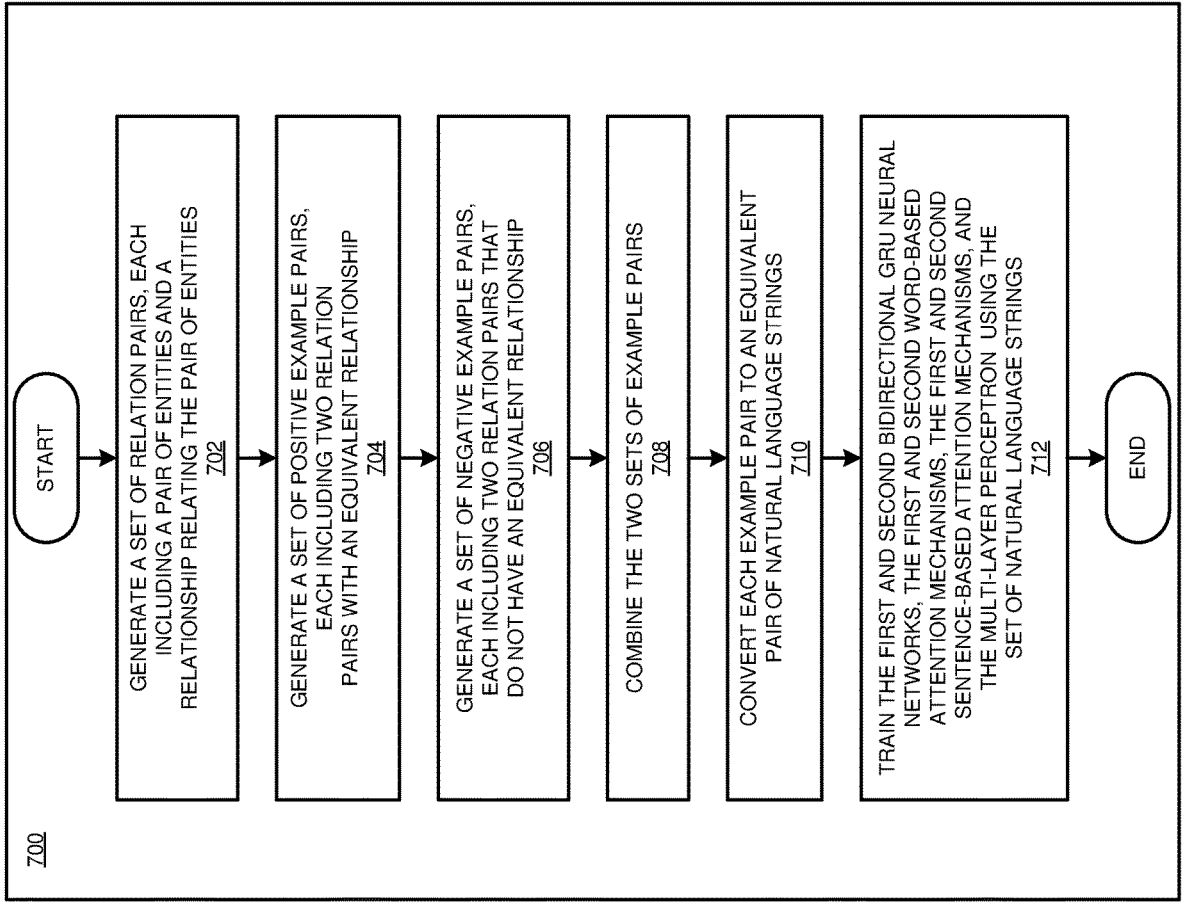
FIG. 7 depicts a flowchart of the training portion of an example process for relation extraction from text using machine learning in accordance with an illustrative embodiment.

With reference to FIG. 7, this figure depicts a flowchart of the training portion of an example process for relation extraction from text using machine learning in accordance with an illustrative embodiment. Process 700 can be implemented in application 300 in FIG. 3.

In block 702, the application generates a set of relation pairs, each including a pair of entities and a relationship relating the pair of entities. In block 704, the application generates a set of positive example pairs, each including two relation pairs with an equivalent relationship. In block 706, the application generates a set of negative example pairs, each including two relation pairs that do not have an equivalent relationship. In block 708, the application combines the two sets of example pairs. In block 710, the application converts each example pair to an equivalent pair of natural language strings. In block 712, the application uses the set of natural language strings to train the first and second bidirectional GRU neural networks, the first and second word-based attention mechanisms, the first and second sentence-based attention mechanisms, and the multi-layer perceptron.

Thus, a computer implemented method, system or apparatus, and computer program product are provided in the illustrative embodiments for relation extraction from text using machine learning and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   operating a first neural network on a processor and a memory to encode a first natural language string into a first sentence encoding comprising a set of word encodings;
   adjusting, using a word-based attention mechanism with a context vector, a weight value for a word encoding within the first sentence encoding to form an adjusted first sentence encoding, a sentence layer of the first neural network comprising the word-based attention mechanism with the context vector, the word-based attention mechanism trained to form the adjusted first sentence encoding by adjusting a plurality of weights within the sentence layer;
   generating, using a sentence-based attention mechanism, a first relationship encoding corresponding to the adjusted first sentence encoding, the sentence-based attention mechanism further adjusting a plurality of adjusted sentence encodings output from the word-based attention mechanism, the first relationship encoding comprising a vector representation of a relationship between entities, the relationship expressed in the first natural language string, a relation layer of the first neural network comprising the sentence-based attention mechanism, the sentence-based attention mechanism trained to generate the first relationship encoding by adjusting a plurality of weights within the relation layer;
   computing an absolute difference between the first relationship encoding and a second relationship encoding; and
   determining, using a multi-layer perceptron, a degree of analogical similarity between the first relationship encoding and the second relationship encoding.

2. The method of claim 1, further comprising:
   operating a second neural network on a processor and a memory to encode a second natural language string into a second sentence encoding comprising a second set of word encodings;
   adjusting, using a second word-based attention mechanism with a second context vector, a weight value for a word encoding within the second sentence encoding to form an adjusted second sentence encoding; and
   determining, using a second sentence-based attention mechanism, the second relationship encoding corresponding to the adjusted second sentence encoding.

3. The method of claim 2, wherein the first neural network and the second neural network are identically structured.

4. The method of claim 2, wherein the word-based attention mechanism with the context vector and the second word-based attention mechanism with the second context vector are identically structured.

5. The method of claim 2, wherein the sentence-based attention mechanism and the second sentence-based attention mechanism are identically structured.

6. The method of claim 2, further comprising:
   determining, using an output unit including a sigmoid activation function, that the first relationship encoding and the second relationship encoding correspond to an analogous relationship.

7. The method of claim 2, further comprising:
   determining, using an output unit including a sigmoid activation function, that the first relationship encoding and the second relationship encoding do not correspond to an analogous relationship.

8. The method of claim 2, further comprising:
   training, using a set of pairs of natural language strings, wherein each natural language string in the set of pairs of natural language strings expresses a relationship between entities included in the natural language string, the first neural network and the second neural network.

9. The method of claim 8, further comprising:
   generating a set of relation pairs, wherein each relation pair in the set of relation pairs comprises a pair of entities and a relationship relating the pair of entities;
   generating a set of positive example pairs, wherein each positive example pair comprises two relation pairs, a relationship of each relation pair in the set of positive example pairs being equivalent to each other;
   generating a set of negative example pairs, wherein each negative example pair comprises two relation pairs, a relationship of each relation pair in the set of negative example pairs not being equivalent to each other;
   combining, forming a training set of example pairs, the set of positive example pairs and the set of negative example pairs; and
   converting, by extracting from a text corpus a natural language string expressing a relationship between entities included in the natural language string, the training set of example pairs to a training set of pairs of natural language strings.

10. A computer usable program product comprising one or more computer-readable storage media, and program instructions stored on at least one of the one or more computer-readable storage media, the stored program instructions comprising:
    program instructions to operate a first neural network on a processor and a memory to encode a first natural language string into a first sentence encoding comprising a set of word encodings;
    program instructions to adjust, using a word-based attention mechanism with a context vector, a weight value for a word encoding within the first sentence encoding to form an adjusted first sentence encoding, a sentence layer of the first neural network comprising the word-based attention mechanism with the context vector, the word-based attention mechanism trained to form the adjusted first sentence encoding by adjusting a plurality of weights within the sentence layer;

program instructions to generate, using a sentence-based attention mechanism, a first relationship encoding corresponding to the adjusted first sentence encoding, the sentence-based attention mechanism further adjusting a plurality of adjusted sentence encodings output from the word-based attention mechanism, the first relationship encoding comprising a vector representation of a relationship between entities, the relationship expressed in the first natural language string, a relation layer of the first neural network comprising the sentence-based attention mechanism, the sentence-based attention mechanism trained to generate the first relationship encoding by adjusting a plurality of weights within the relation layer;

program instructions to compute an absolute difference between the first relationship encoding and a second relationship encoding; and program instructions to determine, using a multi-layer perceptron, a degree of analogical similarity between the first relationship encoding and the second relationship encoding.

11. The computer usable program product of claim 10, further comprising:

program instructions to operate a second neural network on a processor and a memory to encode a second natural language string into a second sentence encoding comprising a second set of word encodings;

program instructions to adjust, using a second word-based attention mechanism with a second context vector, a weight value for a word encoding within the second sentence encoding to form an adjusted second sentence encoding; and program instructions to determine, using a second sentence-based attention mechanism, the second relationship encoding corresponding to the adjusted second sentence encoding.

12. The computer usable program product of claim 11, wherein the first neural network and the second neural network are identically structured.

13. The computer usable program product of claim 11, wherein the word-based attention mechanism with the context vector and the second word-based attention mechanism with the second context vector are identically structured.

14. The computer usable program product of claim 11, wherein the sentence-based attention mechanism and the second sentence-based attention mechanism are identically structured.

15. The computer usable program product of claim 11, further comprising:

program instructions to determine, using an output unit including a sigmoid activation function, that the first relationship encoding and the second relationship encoding correspond to an analogous relationship.

16. The computer usable program product of claim 11, further comprising:

program instructions to determine, using an output unit including a sigmoid activation function, that the first relationship encoding and the second relationship encoding do not correspond to an analogous relationship.

17. The computer usable program product of claim 11, further comprising:

program instructions to train, using a set of pairs of natural language strings, wherein each natural language string in the set of pairs of natural language strings expresses a relationship between entities included in the natural language string, the first neural network and the second neural network.

18. The computer usable program product of claim 10, wherein the stored program instructions are stored in a computer-readable storage medium in a data processing system, and wherein the stored program instructions are transferred over a network from a remote data processing system.

19. The computer usable program product of claim 10, wherein the stored program instructions are stored in a computer-readable storage medium in a server data processing system, and wherein the stored program instructions are downloaded over a network to a remote data processing system for use in a computer readable storage medium associated with the remote data processing system.

20. A computer system comprising one or more processors, one or more computer-readable memories, and one or more computer-readable storage media, and program instructions stored on at least one of the one or more computer-readable storage media for execution by at least one of the one or more processors via at least one of the one or more computer-readable memories, the stored program instructions comprising:

program instructions to operate a first neural network on a processor and a memory to encode a first natural language string into a first sentence encoding comprising a set of word encodings;

program instructions to adjust, using a word-based attention mechanism with a context vector, a weight value for a word encoding within the first sentence encoding to form an adjusted first sentence encoding, a sentence layer of the first neural network comprising the word-based attention mechanism with the context vector, the word-based attention mechanism trained to form the adjusted first sentence encoding by adjusting a plurality of weights within the sentence layer;

program instructions to generate, using a sentence-based attention mechanism, a first relationship encoding corresponding to the adjusted first sentence encoding, the sentence-based attention mechanism further adjusting a plurality of adjusted sentence encodings output from the word-based attention mechanism, the first relationship encoding comprising a vector representation of a relationship between entities, the relationship expressed in the first natural language string, a relation layer of the first neural network comprising the sentence-based attention mechanism, the sentence-based attention mechanism trained to generate the first relationship encoding by adjusting a plurality of weights within the relation layer;

program instructions to compute an absolute difference between the first relationship encoding and a second relationship encoding; and program instructions to determine, using a multi-layer perceptron, a degree of analogical similarity between the first relationship encoding and the second relationship encoding.

* * * * *